United States Patent [19]

Asahara et al.

[11] 4,065,283
[45] Dec. 27, 1977

[54] METHOD FOR MAKING A GLASS-BASED SOFT-EDGED APERTURE FILTERS

[75] Inventors: Yoshijuki Asahara, Kawasaki; Tetsuro Izumitani, Hino, both of Japan

[73] Assignee: Hoya Glass Works, Ltd., Tokyo, Japan

[21] Appl. No.: 668,999

[22] Filed: Mar. 22, 1976

[30] Foreign Application Priority Data

Mar. 22, 1975 Japan .................................. 50-34613
May 20, 1975 Japan .................................. 50-60061

[51] Int. Cl.² ................... C03C 15/00; C03B 11/08; C03C 19/00
[52] U.S. Cl. ...................... 65/30 E; 65/33; 65/30 R; 65/37; 65/60 C; 65/61
[58] Field of Search ............... 65/30 E, 30 R, 33, 37, 65/60 C, 61

[56] References Cited

U.S. PATENT DOCUMENTS

| | | | |
|---|---|---|---|
| 2,925,370 | 2/1960 | Rohrer | 65/61 X |
| 3,486,808 | 12/1969 | Hamblen | 65/37 UX |
| 3,495,963 | 2/1970 | Buckley et al. | 65/30 E |
| 3,528,847 | 9/1970 | Grego et al. | 65/30 E X |
| 3,563,057 | 2/1971 | Rosenbauer | 65/37 |
| 3,764,198 | 10/1973 | Hunzinger | 65/DIG. 7 |
| 3,802,761 | 4/1974 | Giallorenzi et al. | 65/30 E X |
| 3,843,343 | 10/1974 | Okada et al. | 65/33 |
| 3,846,099 | 11/1974 | Simmons | 65/30 E |
| 3,873,408 | 3/1975 | Hensler | 65/33 X |
| 3,888,648 | 6/1975 | West et al. | 65/30 E |
| 3,907,586 | 9/1975 | Kiefer | 65/30 E X |
| 3,940,531 | 2/1976 | Demarest, Jr. | 65/33 X |

*Primary Examiner*—S. Leon Bashore
*Assistant Examiner*—Frank W. Miga
*Attorney, Agent, or Firm*—Sughrue, Rothwell, Mion, Zinn and Macpeak

[57] ABSTRACT

Glass-based soft-edged aperture filters having good thermal stability are produced by diffusing a coloring element such as Ag into a glass, thus providing a transmittance gradient in the colored portion thereof. A glass composition comprising a basic glass, such as a silicate, borosilicate or phosphate glass, and 1 to 10% by weight of $As_2O_3$ and/or $Sb_2O_3$ is especially suitable for producing such soft-edged aperture filters.

9 Claims, 14 Drawing Figures

FIG 1a
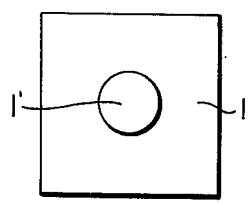
FIG 1b
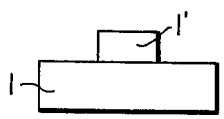
FIG 2
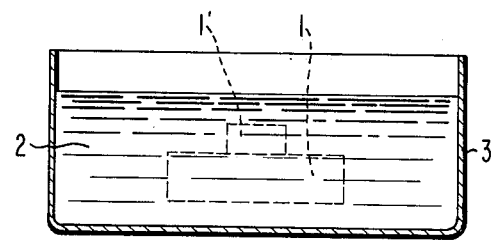
FIG 3a
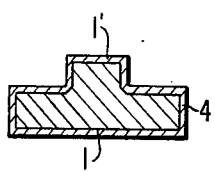
FIG 3b
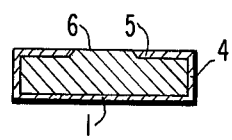
FIG 3c
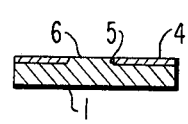
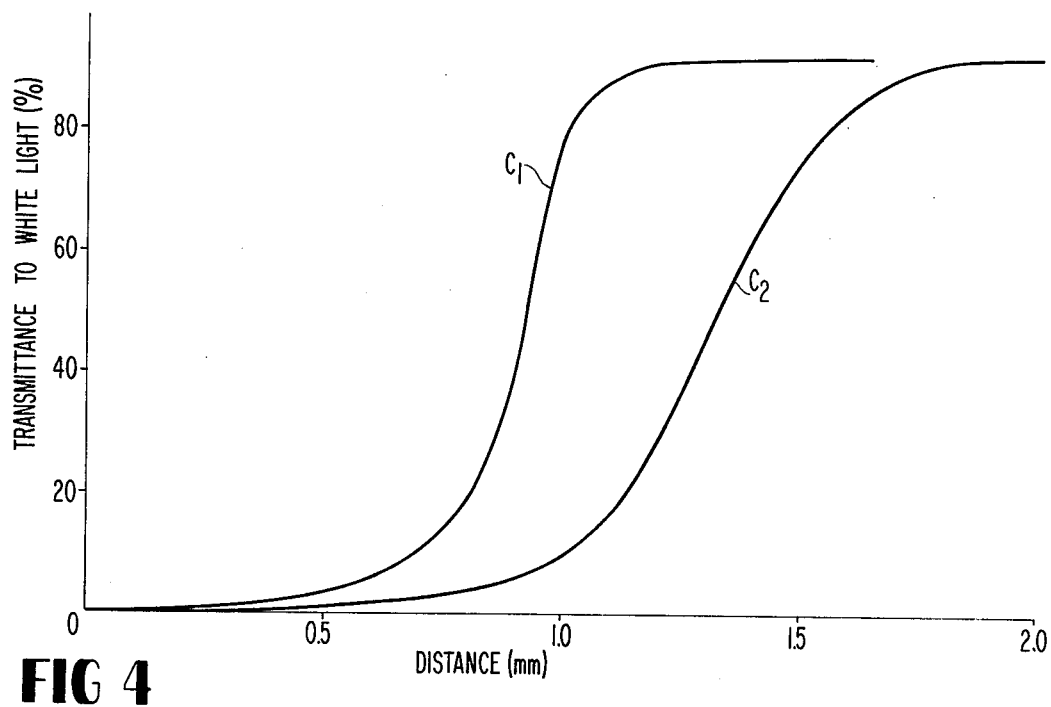
FIG 4

METHOD FOR MAKING A GLASS-BASED SOFT-EDGED APERTURE FILTERS

BACKGROUND OF THE INVENTION

1. Field of the Invention

This invention relates to a method for producing a soft-edged aperture filter comprising a glass matrix and having good thermal stability, and to a glass which is particularly suited for the production of such a soft-edged aperture filter.

2. Description of the Prior Art

Generally, when large light beams are truncated at the input edge of a glass rod, a strong focusing of light occurs in the central part of the glass rod due to Fresnel diffraction at the edge of the glass rod. In a laser glass used for emitting high output laser light, this self-focusing effect due to diffraction induces breakage of the glass. In order to prevent such Fresnel diffraction and thus to prevent breakage of the glass, a soft-edged aperture filter is used. The filter is one which has high transmittance within a radius $r_o$, and whose transmittance gradually drops to a low value at greater radii, and which then prevents transmission of light beyond a certain radii. Such filters are described in detail in A. J. Campillo et al; *Laser Focus,* June p62 (1974), A. J. Campillo et al; *Appl. Phys. Lett.,* 23 [2] 85 (1973), A. J. Campillo et al; Submitted to VIII International Quantum Electronics Conference (1974) D7, and in A. J. Campillo et al.; Submitted to Opt. Communication.

Conventional methods for producing soft-edged aperture filters include the following. One method comprises shielding the light generated from a plate-like light source and scattered by means of a scattering plate with a circular plate, and printing the light on a silver halide photographic film. The portion which is completely shielded from light by the circular plate becomes transparent after development, but the portion which is exposed to diffraction light from around the circular plate forms a transmittance gradient around the transparent portion after development in which the transmittance gradually decreases at increasing radial distances, i.e., a decrease in transmittance occurs in the region of diffraction light exposure (see the fourth reference above cited by Campillo et al.) On the other hand, the portions exposed to the light not shielded by the circular plate become black after development, and have a transmittance of 0. This method has the advantages of low cost and simplicity, but is defective in that the resulting filter does not have good thermal stability. Furthermore, it is necessary to coat thereon a refractive index matching liquid (e.g., glycerol) to remove interference fringe ascribable to the non-uniform thickness of the silver halide photographic film.

Another method involves the use of a vacuum-deposited metal film, etc., and comprises vacuum-depositing films which have different refractive indices with increasing radius from $r_o$ concentrically in an annular form on a transparent substrate plate, so that the final film does not permit the transmission of light at radius $r_1$. However, since the number of vacuum-deposited layers is limited, a smooth transmittance gradient from $r_o$ to $r_1$ can generally not be obtained, and it frequently becomes ripple-like. Moreover, the manufacturing process is complicated, and the resulting filter does not have good thermal stability.

SUMMARY OF THE INVENTION

One object of this invention is to provide a method for producing a soft-edged aperture filter comprising glass which has superior thermal stability, i.e., high resistance to the thermal shock caused by high power laser irradiation, as compared to the vacuum deposited film or the silver halide photographic film of the prior art.

Another object of this invention is to provide a glass which is particularly suited for the production of the above soft-edged aperture filter.

According to this invention, there is first provided a method for producing a soft-edged aperture filter which comprises diffusing a coloring element in a glass, and providing a transmittance gradient in the diffused part.

According to another aspect of this invention, there is provided a glass for a soft-edged aperture filter utilizing the coloration of a coloring element diffused in the glass, the glass comprising a basic glass and 1 to 10% by weight of $As_2O_3$ and/or $Sb_2O_3$, there being no limitation whatsoever of substance on the ratio of $As_2O_3$ or $Sb_2O_3$ if both are simultaneously used.

BRIEF DESCRIPTION OF THE DRAWINGS

FIGS. 1a and 1b are a plan view and an elevation, respectively, of a soft-edged aperture filter glass;

FIG. 2 is an elevation in cross section showing an example of coloring the glass with Ag;

FIGS. 3a, 3b and 3c are elevations in cross section illustrating the process of producing a filter from the colored glass;

FIG. 4 is a transmittance curve of a filter in accordance with this invention;

DETAILED DESCRIPTION OF PREFERRED EMBODIMENTS

Figure 5:
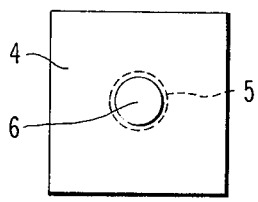
FIG. 5 is a plan view of the above filter showing the position of measuring its transmittance.

We have found that by diffusing a coloring element such as Ag into a glass, a soft-edged aperture filter can be made.

In more detail, we have found that by diffising a coloring element such as Ag into a glass, the transmittance thereof can be gradually decreased from about 100% to about $10^{-4}$% with increasing aperture radii, the gradually decreasing transmittance and the slope of the decrease depending upon the the aperture radius.

The Ag is typically supplied in the form of $Ag_2O$. The amount of $Ag_2O$ in the glass composition is up to about 20 mol%, but, it is to be noted that the upper limit of $Ag_2O$ is not limited thereto, nor are the coloring agents or elements limited to Ag. However, Ag is most commercially preferred.

It is generally known that Ag diffuses easily into a glass. When glass A not containing Ag is immersed in an Ag-containing solution or fused with an Ag-containing glass B, and then heat-treated at a high temperature, Ag diffuses into glass A. Consequently, a gradient in the concentration of the Ag is formed towards the interior of glass A from the contact surface between glass A and the solution or between glass A and glass B. Thus, a transmittance gradient proportional to the concentration of Ag diffused is also formed.

When a phosphate glass capable of containing a large quantity of Ag (even when the content of $Ag_2O$ is 60 mol%, the batch can be vitrified) is used as glass A, Ag thus diffused is present in the form of ions, and diffused portions are colored a pale yellow. When a silicate glass or borosilicate glass which can contain Ag only in a small amount is used as glass A, the diffused Ag is present as colloidal or metallic Ag. Hence, it is colored black-brown, and prevents the transmission of light in the visible region and spectral regions near the visual region. A transmittance gradient can therefore be obtained utilizing the concentration gradient of the diffused Ag and the blackening effect of the diffused Ag in the silicate or borosilicate glass. Filters comprising a phosphate glass can also be used for light of short wavelengths.

One example of the production of a soft-edged aperture filter in accordance with the method of this invention is described below.

A glass matrix 1 having a projection 1' of the shape as shown in FIGS. 1a and 1b is immersed in $AgNO_3$ 2 in receptacle 3 as shown in FIG. 2, and heated at a temperature near the glass transition temperature (Tg) of the glass. As a result, Ag diffuses into the glass, and a glass matrix as shown in FIG. 3a having a layer 4 colored with Ag is formed. When the projection 1' of the glass matrix is removed, colored portion 4, a portion 5 with gradually changing coloration, and an uncolored portion 6 remain as shown in FIG. 3b. Then, the lower portion of the glass is removed, and both surfaces thereof are polished to provide a soft-edged aperture filter as shown in FIG. 3c.

In order to cause light to be completely absorbed by the colored portion of the soft-edged aperture filter obtained by the above method, it is necessary to diffuse the coloring metal such as Ag at high efficiency, and to increase the absorption of light per unit thickness of the diffused portion.

A glass in accordance with a second embodiment of the present invention was invented as a result of the discovery that the efficiency of light absorption per unit thickness of an Ag-diffused portion is markedly affected by $As_2O_3$ and/or $Sb_2O_3$ in the glass matrix.

Ag is mainly used as the coloring element because it is easily diffusable, but the same effect is achieved using other coloring components such as Cu, Au, transition metals (e.g., Fe, V, Co, Ni), and rare earth elements (e.g., Ce, Nd, Eu). When the coloration of an ion such as a transition metal is utilized, the glass matrix can either be a phosphate glass or a silicate glass.

Since the soft-edged aperture filter produced in accordance with this invention is essentially glass, it is characterized by a much higher thermal stability than the vacuum-deposited films or silver halide photographic films of the prior art.

The following Examples Illustrate the present invention more specifically. In the following Examples, all processings were conducted in air at normal atmospheric pressure, unless otherwise indicated.

EXAMPLE 1

A glass matrix 1 having a circular projection 1' as shown in FIGS. 1a and 1b was produced from a glass consisting of 60 mol% of $SiO_2$, 30 mol% of $Na_2O$ and 10 mol% of CaO. The glasses used in the examples can be prepared by melting a mixture of the described components in a platinum crucible at a temperature of about 1400° C, refining the melt, casting the glass into the desired shape and then cooling to room temperature at a rate less than 5° C/min. As shown in FIG. 2, pure $AgNO_3$ Z was placed in a stainless steel receptacle 3, and dissolved therein at a temperature of 480° C which was near the transition point (Tg) of the glass matrix 1. Then, the glass matrix was immersed in the resulting $AgNO_3$ solution and maintained at 480° C for 6 hours, and thereafter removed therefrom and permitted to cool naturally to room temperature. The vertical section of the glass matrix at this time was as shown in FIG. 3a. An Ag-diffused layer 4 was formed in the glass matrix to a depth of about 2 mm from the surface of the glass matrix, and this portion was colored black-brown.

When projection 1' was removed by grinding and polishing, an Ag concentration gradient 5 resulted together with an uncolored portion 6 in which Ag was not diffused, as shown in FIG. 3b. The colored portion at the bottom and the side of the glass matrix was then removed by grinding and polishing, and both surfaces of the glass were polished. Thus, a soft-edged aperture filter having a non-transparent portion 4, a portion of gradually changing transmittance 5, and a transparent portion 6 was thus obtained.

Changes in transmittance at the portion 5 are shown by curve $C_1$ in FIG. 4.

EXAMPLE 2

A glass matrix, as shown in FIG. 1, was prepared from a glass consisting of 60 mol% $SiO_2$, 28 mol% $Na_2O$, 10 mol% CaO and 2 mol% $Al_2O_3$. It was immersed in $AgNO_3$ and heated at 500° C for 24 hours, and then treated in the same way as in Example 1 to provide a soft-edged aperture filter. Changes in transmittance at the portion 5 at which the transmittance changed gradually are shown by curve $C_2$ in FIG. 4.

EXAMPLE 3

Figure 6:
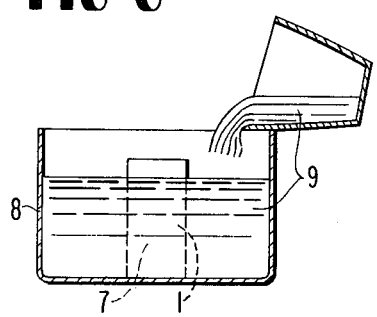
FIG. 6 is an elevation in cross section showing one step of an embodiment of this invention.
Figure 7:
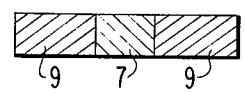
FIG. 7 is a vertical sectional view of a filter in accordance with this invention.

As illustrated in FIG. 6, a silicate glass as in Example 1 was fabricated into a cylinder 7 and stood erect in the center of a high melting glass receptacle 8. The cylinder had a diameter of about 10 mm and a height of about 30 mm. A low melting glass 9 of the phosphate type containing 5 to 10 mol% of $V_2O_5$ (an oxide having absorption in the visible region and regions just outside the visible region) and $Ag_2O$ was melted, and poured into the receptacle 8. In this case, the $Ag_2O$ content was 1 mol%, based on the total amount of glass present. In this regard, it should be noted that any low melting point phosphate glass can be used with success in the present invention, but most preferred phosphate glass systems comprise: $V_2O_5$ 5-10 mol%; $Ag_2O$ 5-10 mol%; and $P_2O_5$ 80-85 mol%; such a preferred glass was used in this Example. In this state, the glasses were heated for 10 to 20 hours at the transition point (Tg) of the glass cylinder, annealed, i.e., cooled at a rate of less than 5° C/min., and withdrawn from the receptacle 8. The cylinder was then formed into a matrix as shown in FIG. 1. When the upper and lower flat portions of the resulting cylindrical product were cut off (each portion cut off was 4 mm in length along the major axis of the cylinder) and the resulting surfaces polished, a soft-edged aperture filter as shown in FIG. 7 was obtained.

Figure 8A:
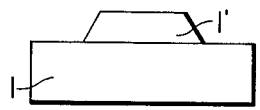
FIGS. 8a and 8b are elevations showing modified examples of a glass matrix.
Figure 8B:
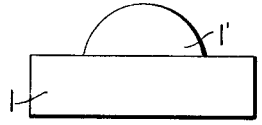
Figure 8C:

Furthermore, various transmittance gradients can be obtained by performing Examples 1 and 2 in the same way except that the shape of the projection 1' of the glass matrix 1 is changed as shown in FIGS. 8a, 8b and 8c, or the heat-treatment carried out on a product as shown in FIG. 3c. Also, by adjusting the extent of removal of the projection 1' as shown in FIG. 3a, the width of a portion having a transmittance gradient, that is, the distance from $r_1$ to $r_o$, can be adjusted.

EXAMPLE 4

This example illustrates a glass in accordance with the second embodiment of this invention.

A plate 2 cm × 1.5 cm × 0.5 cm, made of glass consisting of a basic glass composed of 30 mol% $Na_2O$, 10 mol% $CaO$ and 60 mol% $SiO_2$ and 1 to 10% by weight $As_2O_3$ and/or $Sb_2O_3$, more specifically a total of 4 weight % of $As_2O_3 + Sb_2O_3$ (equivalent results were obtained in an otherwise identical process except for using 4 weight % of $Sb_2O_3$) was immersed in pure $AgNO_3$ and heated at 480° C for about 24 hours. The plate was then polished at both flat surfaces thereof, and its transmittance measured. The optical density at a 1.06 μ thick diffused portion and the thickness of the colored layer versus changes in the amount of $As_2O_3$ and/or $Sb_2O_3$ were plotted and are given in FIG. 9.

Figure 9:
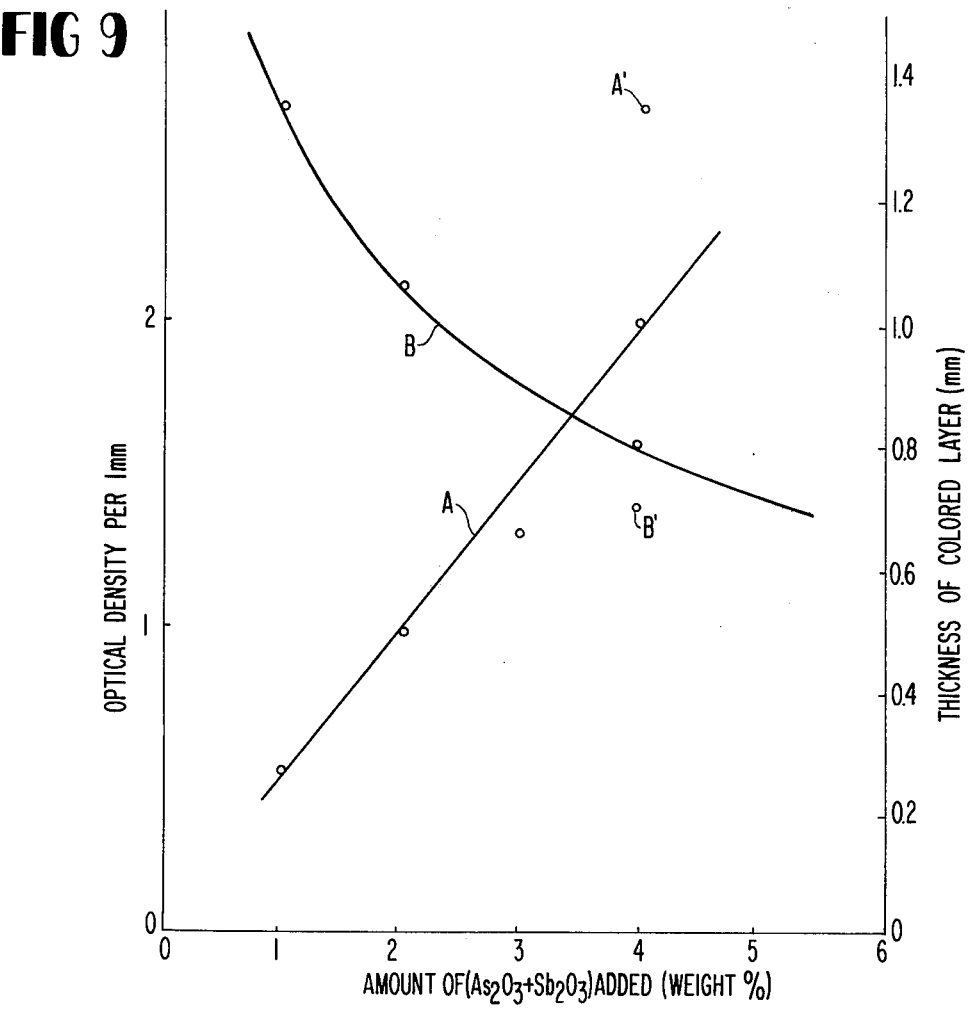
FIG. 9 is a graphic representation showing the relationship of the optical density and the thickness of the colored layer with respect to the amount of $As_2O_3$ + $Sb_2O_3$ in the glass in accordance with another aspect of this invention.

It can be seen from FIG. 9 that with increasing amounts of $As_2O_3$ and/or $Sb_2O_3$, the optical density per mm of thickness increases as shown by curve A, and the efficiency of absorption at 1.06 μ increases. The effect of $As_2O_3$ and $Sb_2O_3$ begins to appear when each is used in an amount of 0.5% by weight (the total of the two being 1.0% by weight) or, of course, if either is used alone in an amount of at least 1.0% by weight [which would correspond to 9.1% to 0.99% by weight based on the total glass weight]. With an increase in the amounts of $As_2O_3$ and $Sb_2O_3$, the thickness of the diffused layer (colored layer) decreases as shown by curve B in FIG. 9, and the addition of these components in too large an amount may result in a substantial inhibition of the coloration effect. From this viewpoint, the total amount of $As_2O_3$ and $Sb_2O_3$ should be up to 10% by weight. When only $Sb_2O_3$ is added in an amount of 4% by weight, the efficiency of the absorption becomes higher (as at point A') than in the case of adding both $As_2O_3$ and $Sb_2O_3$, and the thickness of the colored layer decreases as shown by point B'.

When the glass in accordance with the second embodiment of this invention is used, the heat-treating time required for the diffusion of Ag can be shortened, and the thickness of the colored portion (diffused portion) can be decreased. In this regard, it should be noted that for most commercial products the depth of the diffusion in accordance with the present invention will generally be from about 0.6 to about 1.0 mm. Consequently, the projection and the lower part of the diffused layer are easy to remove. The most characteristic feature is, however, that the transmittance can be reduced to substantially zero at the colored portion 4.

While the invention has been described in detail and with reference to specific embodiment thereof, it will be apparent to one skilled in the art that various changes and modifications can be made therein without departing from the spirit and scope thereof.

What is claimed is:

1. A method for producing a soft edged aperture filter to prevent Fresnel diffraction at the edge of a glass rod which comprises diffusing a coloring element into a glass plate which has on a first surface thereof a glass projection portion which does not extend to any side of the glass plate, wherein said diffusion is into the projection and into said first surface and bottom surface of the plate, and subsequently removing said glass projection portion down to said first surface having said diffused coloring element without disturbing said first surface and removing the diffused bottom surface to thereby provide a light transmittance gradient arranged in a circle on the glass plate, the gradient being a lowering of the light transmittance between the first and second surfaces of the glass plate in the radial direction from the inner to the outer portion of the circle.

2. The method as claimed in claim 1, wherein said projection portion has the shape of
   a. a cylinder attached at a base surface thereof to the first surface of the glass plate;
   b. a truncated right cone attached at the larger base thereof to the first surface of the glass plate; or
   c. a hemispherical convex attached at the base thereof to the first surface of the glass plate.

3. The method as claimed in claim 1, wherein the coloring element is selected from the group consisting of Ag, Cu and Au metals and transistion metal ions.

4. The method as claimed in claim 3, wherein said coloring element is Ag.

5. The method as claimed in claim 1, wherein the glass plate comprises a basic glass and 1 to 10% by weight of $As_2O_3$ and/or $Sb_2O_3$.

6. The method as claimed in claim 1, wherein the glass plate comprises a basic glass and 4% by weight of $Sb_2O_3$.

7. The method as claimed in claim 5, wherein said basic glass is selected from the group consisting of a silicate, borosilicate or phosphate glass.

8. The method as claimed in claim 1, wherein said diffusion is accompanied by heating at a temperature near the glass transistion temperature Tg of the glass plate.

9. The method as claimed in claim 1, wherein said light transmittance gradient is a gradient which decreases from about 100% to about $10^{-4}$% in said radial direction.

* * * * *